(12) United States Patent
Smith

(10) Patent No.: US 8,334,996 B2
(45) Date of Patent: Dec. 18, 2012

(54) AUTOMATED E-MAIL ADDRESS BOOK UPDATE SYSTEM AND METHOD FOR DOCUMENT OUTPUT DEVICES

(75) Inventor: Todd D Smith, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 1124 days.

(21) Appl. No.: 11/956,078

(22) Filed: Dec. 13, 2007

(65) Prior Publication Data

US 2009/0153909 A1 Jun. 18, 2009

(51) Int. Cl.
*G06F 3/12* (2006.01)
*H04N 1/00* (2006.01)

(52) U.S. Cl. .................. 358/1.15; 358/402; 358/440

(58) Field of Classification Search .................. 358/1.15, 358/402, 440, 1.1, 1.16, 400, 401, 403
See application file for complete search history.

(56) References Cited

U.S. PATENT DOCUMENTS

| 6,873,985 | B2 | 3/2005 | Newman | |
|---|---|---|---|---|
| 7,474,432 | B1 * | 1/2009 | Kirchhoff et al. | 358/1.15 |
| 2003/0030848 | A1 * | 2/2003 | Inoue | 358/402 |
| 2007/0214225 | A1 * | 9/2007 | Eda | 709/206 |

FOREIGN PATENT DOCUMENTS

JP 2004040304 A * 2/2004

* cited by examiner

*Primary Examiner* — Thomas D Lee
(74) *Attorney, Agent, or Firm* — Ronald E. Prass, Jr.; Prass LLP

(57) ABSTRACT

A method for adding a user's e-mail address to the address book of a networked document output device includes receiving an electronic message from a user, automatically extracting the sender's electronic address, and automatically adding the electronic address to an address book used by the document output device. A networked document output device includes memory for storing document data, means for sending document to users on a network, means for receiving electronic communications from a networked user, and a controller for practicing a method that includes extracting an electronic address from a received e-mail, and adding the user's address to a local address book.

17 Claims, 3 Drawing Sheets

AUTOMATED E-MAIL ADDRESS BOOK UPDATE SYSTEM AND METHOD FOR DOCUMENT OUTPUT DEVICES

The embodiments disclosed herein relate to printing devices that allow users to electronically send documents to recipients.

Many multi-function devices include the ability to scan and send documents to recipients. Today, our customers manually add their e-mail addresses to the local address book of a particular device used to send a document. The e-mail address is added either at the machine or through a network control system such as, for example, CentreWare™ Internet Services. It would be helpful if a user could more easily add his/her e-mail address to the address book of a device.

Embodiments of the present invention include a method including the steps of receiving an electronic message, automatically extracting the sender's electronic address, and automatically adding the electronic address to a local address book.

Embodiments of the present invention also include a method practiced by a networked document output device. The method includes receiving an electronic message from a user, automatically extracting the sender's electronic address, and automatically adding the electronic address to an address book used by the document output device.

Embodiments of the present invention also include a networked document output device. The device includes memory for storing document data, means for sending document to electronically connected document recipients, means for receiving electronic communications from an electronically connected document recipient, and a controller. The controller examines incoming electronic communications from an electronically connected document recipient, extracts the document recipient's electronic address, and adds the document recipient's address to a local address book.

Various exemplary embodiments will be described in detail, with reference to the following figures.

Figure 1:
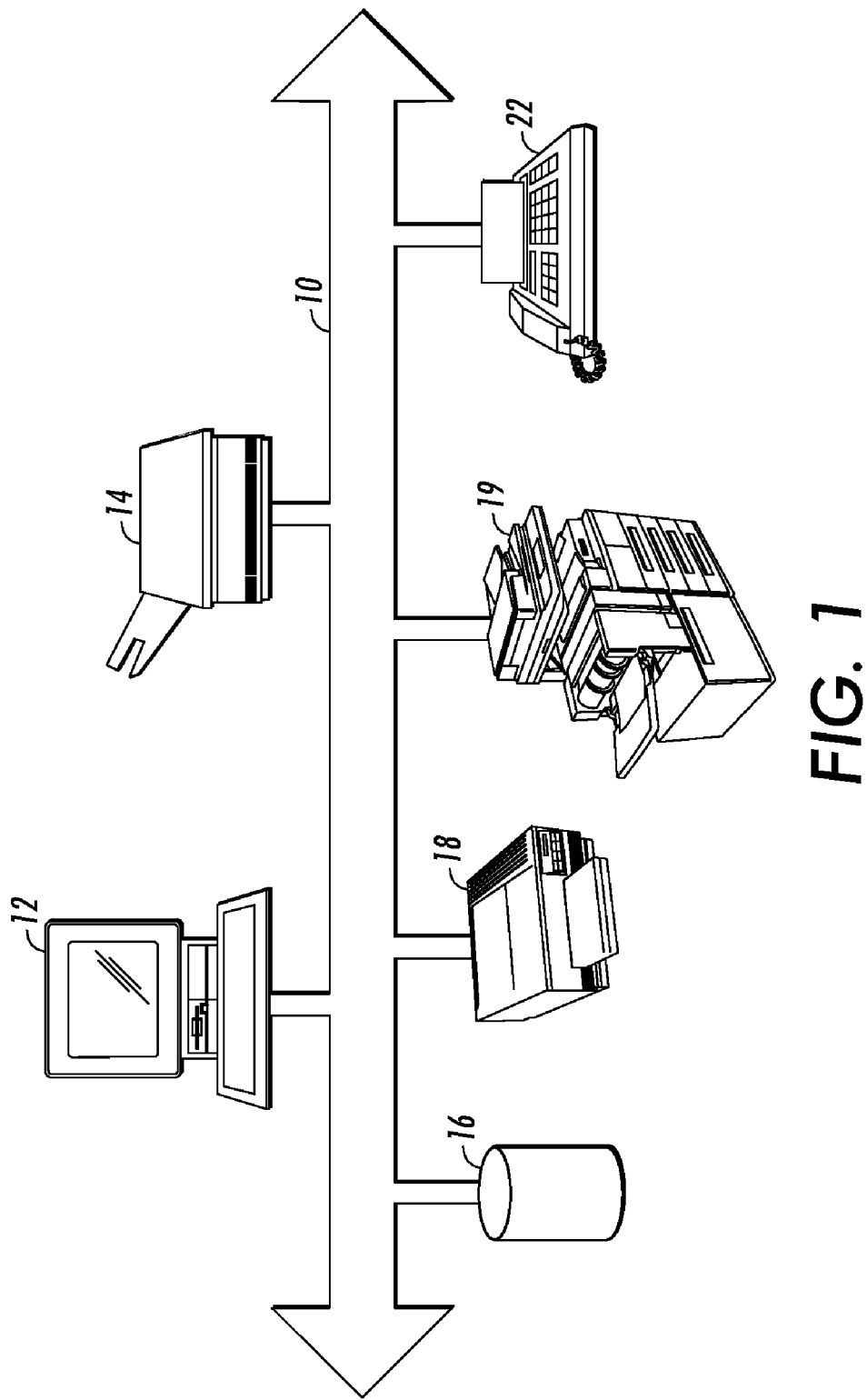
FIG. 1 is a simplified diagram schematically showing a networked document services system in which the present invention can be useful.

FIG. 1 is a simplified diagram showing an example of a networked document-services system in which the present invention is useful. A network bus 10, which may be of any type known in the art, such as Ethernet or Token-Ring, interconnects a number of computers and peripherals. For example, on network 10 there would be typically any number of personal computers such as 12, scanners such as 14, shared memories such as 16, a desktop printer such as 18, and a multifunction device such as 19. The network 10 may further interconnect a fax machine 22, which in turn connects with a standard telephone network. Network 10 may also connect to the Internet. What is important is that the various computers and peripherals can interact to perform various document services.

Figure 2:
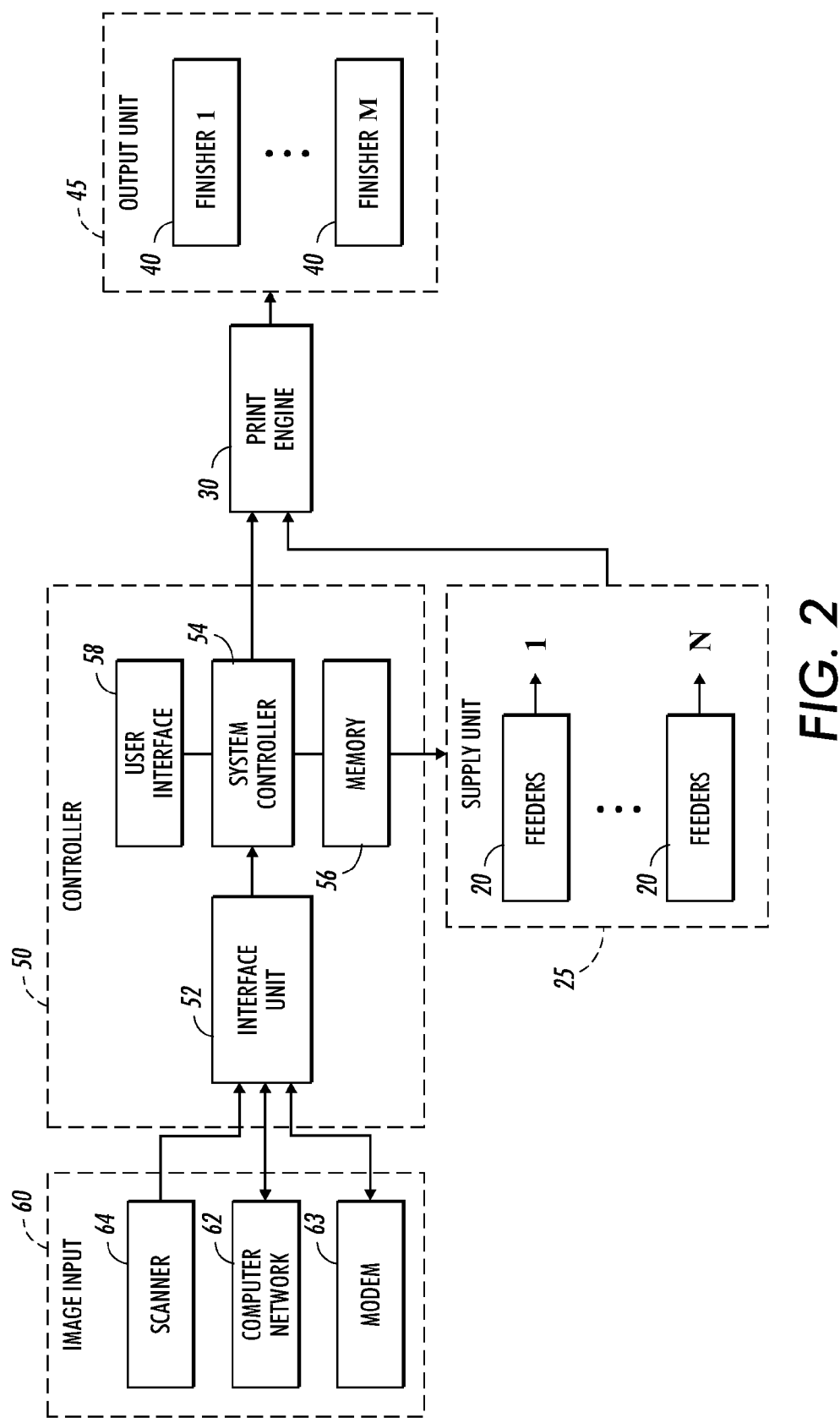
FIG. 2 is a general block diagram of elements of a multi-function device such as the one shown in FIG. 1.

FIG. 2 shows a schematic illustration of the interior workings of the multifunction device 19. An image input section 60 transmits signals to the controller 50. In the example shown, image input section 60 has both remote and onsite image inputs, enabling the multifunction device 19 to provide network, scan and print services. Also note that although referred to as an image input section, output may also occur through electronic means such as computer network 62 and modem 63. Users may send images through the computer network 62 to be printed by the device 19, or images scanned by scanner 64 may be sent out through the network 62. The same is true with modem 63. The data passes through interface unit 52 in the controller 50. The multifunction device 19 can be coupled to multiple networks or scanning units, remotely or onsite. While a specific multifunction device is shown and described, the present invention may be used with other types of printing systems such as analog printing systems.

Many multifunction devices allow a user to scan and send a document through a network to a recipient having an e-mail address. In such embodiments, the device 19 would typically have an assigned e-mail address, although the address of the device does not typically receive incoming mail. Device 19 can send a scanned image through the computer network 62 or modem 63 to a user's e-mail account on a remote server over network 10. The multi-function device 19 may have an address book and/or allow the user to enter the e-mail address of a recipient. For devices that maintain an address book, users typically have to add their e-mail address to the address book either at the device or through software networked to the device.

Another way to add an e-mail address to the address book of a device would be to use the e-mail address assigned to the device 19. There are two primary ways this address could be used. For example, if the device 19 is used to send a scanned document to a remote e-mail address, the device 19 could automatically extract the recipient's address and add it to the device's address book. The device could be told to simply extract the "To:" information and add that information to the address book. Alternatively, the user could send an electronic message through the computer network 62 or modem 63 to the e-mail address associated with the device 19 and the device 19 could extract the sender's information from the e-mail message. For example, the device 19 could add the information associated with the "From" heading of the message to the device's address book. The address book would typically be located in the controller 50. The device could even extract nickname information or other metadata associated with the sender's e-mail address if such information were included. Once the sender's information was added to the address book, the user could use the device without having to expressly add their e-mail address at the device or through external software.

Information extraction in person to person electronic communications is known, generally. For example, Microsoft® Outlook® can be configured to sort and classify incoming messages based upon the content of the "From" line or the "Subject" line. However, the embodiments disclosed herein include a networked device capable of extracting the sender's information and adding it to a local address book. The address extraction program could be included in or accessed by the controller.

To help regulate the addition of users to a device's address book, the device may be required to read or extract a particular phrase in the subject or body of the e-mail such as for example, "Add" or "new user." This step would help prevent the addition of those who do not want to be added to the address book of the device and the accidental addition of those that the operator of the device would not want added.

Figure 3:
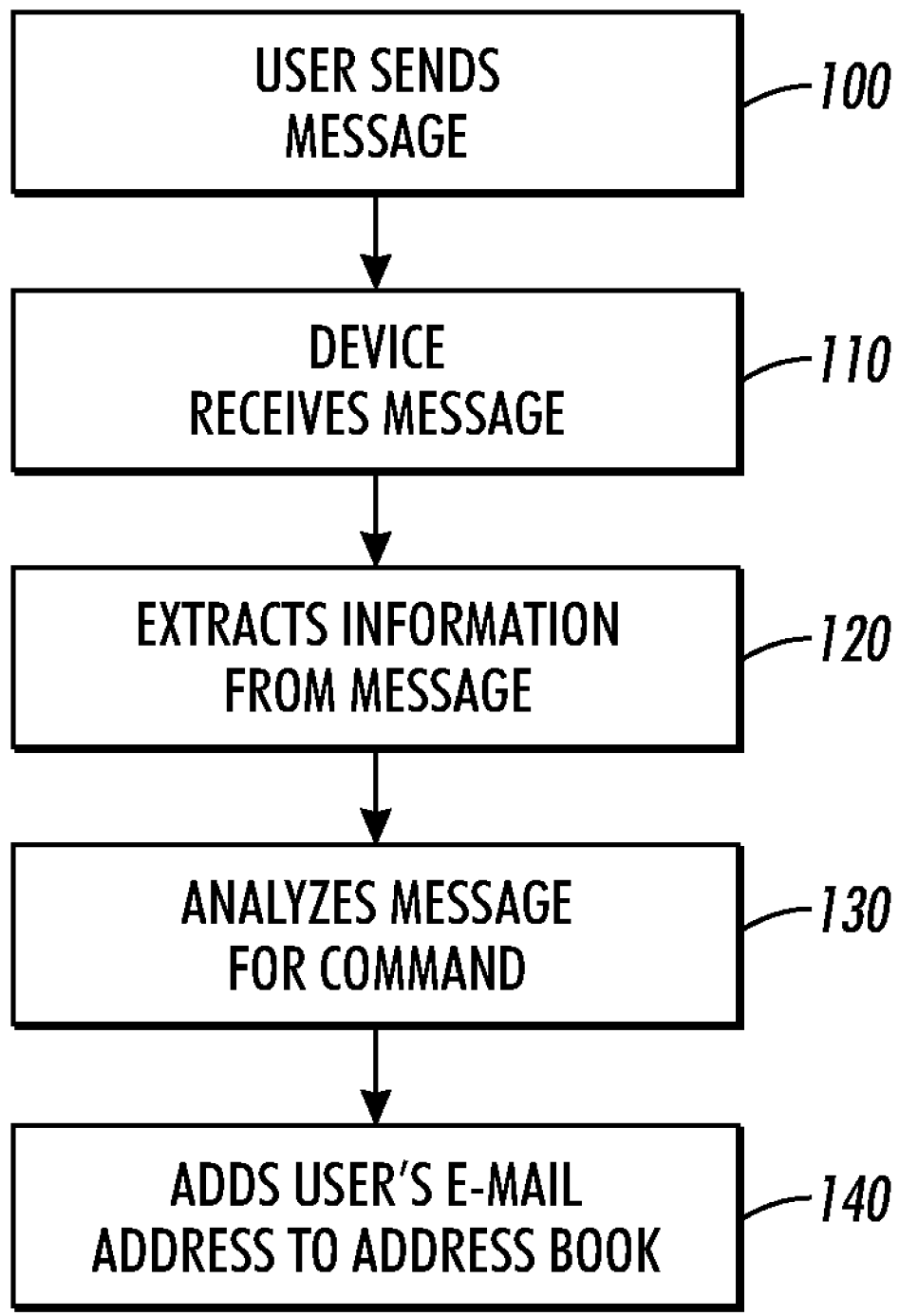
FIG. 3 is a flow chart of an exemplary embodiment of the present invention.

FIG. 3 is a flow chart representing the methods described herein. First, an intended recipient sends 100 an e-mail message to a device capable of sending a document on the network. The device then receives 110 the message. The device would then read or extract 120 information from the message. The device may then analyze 130 the information content of the message for a command or phrase indicating the sender desires his/her electronic address be added to a local address book of the device. The device may be configured to extract an electronic address or e-mail address from the e-mail message if the command or phrase is contained by the e-mail message. For example, the device may be configured to analyze the information content of the message for a command or phrase prior to extracting the user's e-mail address. The device would then add 140 the user's e-mail address to the address book if no command is required or if the message contains the command.

While this invention has been described with respect to a multifunction device, it should be understood that the present invention should work with any document output device that (1) is located on a network, (2) can send a document electronically to the recipient, and (3) is assigned an e-mail address. For example, the scanners 14 may have been assigned addresses. A user may be able to send an electronic message to one of the scanners and automatically have the user's e-mail address added to that scanner's address book. Similarly, a facsimile device may have a scan to e-mail option and may also be assigned an e-mail address.

The present method is also not necessarily limited to devices having scanners. The method works in conjunction with any device capable of storing a document in memory or storage and the ability to electronically transmit that document. The device may include a scanner, a disk drive, CD-ROM drive, DVD-ROM drive, USB port or other means of receiving information from an external source. The device simply needs to have an e-mail address on the network. The device could also be, for example, a server on the network.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

I claim:

1. A method of adding electronic address information to a networked document output device, comprising:
    receiving at the electronic output device an electronic message;
    determining if the electronic message contains a particular phrase;
    extracting a sender's electronic address or a recipient's electronic address if the particular phrase is determined to be contained in the electronic message; and
    automatically adding the extracted electronic address to a local address book.

2. The method of claim 1, where the method is performed by the controller of a networked document output device, the controller having the local address book.

3. The method of claim 1, comprising extracting a recipient's electronic address from the message based on whether the particular phrase is present in the message, wherein the particular phrase is not associated with a stored electronic address.

4. The method of claim 1, comprising extracting the sender's address after the determining if the electronic message contains the particular phrase.

5. The method of claim 1, wherein the recipient's electronic address is extracted only after the determining if the electronic message contains the particular phrase.

6. A method practiced by a networked document output device, the method comprising:
    receiving at a networked document output device an electronic message from a user, the networked output device having an assigned email address;
    reviewing the electronic message for a particular phrase;
    extracting the user's electronic address only if the particular phrase is present in the electronic message; and
    automatically adding the extracted electronic address to an address book used by the document output device.

7. The method of claim 6, where the document output device includes a scanner.

8. The method of claim 7, where the document output device is a facsimile machine.

9. The method of claim 7, where the document output device is a multifunction device.

10. A networked document output device, comprising:
    memory for storing document data including at least one of sender and recipient electronic addresses, the networked document output device being configured for sending documents to electronically connected document recipients, the networked document device being configured for receiving electronic communications at an electronic address assigned to the networked document device; and
    a controller, the controller being connected to the memory, the controller being configured to scan a received electronic communication to determine whether the electronic communication contains a command, the controller being configured to extract an electronic address from the electronic communication if the electronic communication contains the command, the controller being configured to add the extracted electronic address to the memory.

11. The device of claim 10, further comprising a scanner.

12. The device of claim 11, where the document output device includes facsimile capabilities.

13. The device of claim 11, where the document output device is a multifunction device.

14. The device of claim 10, wherein the predetermined command is "add" or "new user."

15. The device of claim 10, wherein the controller is configured to extract a sender's electronic address based on the predetermined command.

16. The device of claim 10, wherein the controller is configured to extract a recipient's email address based on the predetermined command.

17. The device of claim 10, wherein the extracted email address is different than the predetermined command.

* * * * *